(12) United States Patent
Zhang

(10) Patent No.: US 7,955,408 B2
(45) Date of Patent: *Jun. 7, 2011

(54) DEVICE WITH NO EMISSION FOR TREATMENT OF EXHAUST GAS

(75) Inventor: Yuguang Zhang, Guangzhou (CN)

(73) Assignees: Yuguang Zhang, Tianhe District, Guangzhou (CN); Zhongjiang Zhang, Tianhe District, Guangzhou (CN)

( * ) Notice: Subject to any disclaimer, the term of this patent is extended or adjusted under 35 U.S.C. 154(b) by 825 days.

This patent is subject to a terminal disclaimer.

(21) Appl. No.: 11/939,125

(22) Filed: Nov. 13, 2007

(65) Prior Publication Data

US 2008/0181830 A1   Jul. 31, 2008

(30) Foreign Application Priority Data

Jan. 30, 2007   (CN) .......................... 2007 1 0006467

(51) Int. Cl.
*B01D 45/00* (2006.01)

(52) U.S. Cl. ......... 55/446; 55/444; 55/445; 55/DIG. 14; 422/170; 422/168; 181/275; 181/251; 181/257; 181/268; 138/39; 138/44; 138/45; 138/46; 423/212; 423/213.2; 423/213.5; 423/213.7

(58) Field of Classification Search .............. 55/444, 55/445, 446, DIG. 14, DIG. 30; 422/170, 422/168; 181/275, 251, 257, 268; 138/39, 138/44, 45, 46; 423/212, 213.2, 213.5, 213.7

See application file for complete search history.

(56) References Cited

U.S. PATENT DOCUMENTS

| | | | |
|---|---|---|---|
| 1,229,434 A * | 6/1917 | Flockhart | 181/234 |
| 3,016,972 A * | 1/1962 | Dugas | 181/268 |
| 5,932,940 A * | 8/1999 | Epstein et al. | 310/40 MM |
| 6,050,363 A * | 4/2000 | Tu | 181/264 |
| 6,347,609 B1 * | 2/2002 | Bloomer | 123/184.57 |
| 6,392,313 B1 * | 5/2002 | Epstein et al. | 290/52 |
| 6,722,780 B2 * | 4/2004 | Stein et al. | 366/176.1 |

* cited by examiner

*Primary Examiner* — Jason M Greene
*Assistant Examiner* — Dung Bui
(74) *Attorney, Agent, or Firm* — Global IP Serives; Tianhua Gu

(57) ABSTRACT

This Invention relates to a kind of devices with no emission resulted for treatment of exhaust gas. The Device comprises a vessel having openings that serve only as inlet. At least two exchange sections are provided inside the vessel after inlet of exhaust gas. There is a gas chamber at each connection part between two sequential sections. The gas exchange chamber at the first gas exchange section has a through opening leading to outside atmosphere area, and at each one from the second to the last exchange section, there is a feedback pipe to connect to the inlet of the first stage of exchange section. With this configuration, on entering into the exchange section, exhaust gas will be ejected inwards and causes very strong entrainment, which makes the gas chamber become vacuum and sucks air with oxygen from atmosphere into gas chamber via the through opening to atmosphere. Formed high-pressure gas is burned furiously with combustible gas in the gas chamber at next stage, and the remaining exhaust gas is transferred into next exchange stage with high-speed revolution occurring on exhaust gas and momentum transfer. The higher negative pressure is, the more gas is consumed, and remaining gas not-consumed will be fed back to inlet of the Device and treated repeatedly. In this way, the exhaust gas will be burned entirely and no emission will occur.

16 Claims, 4 Drawing Sheets

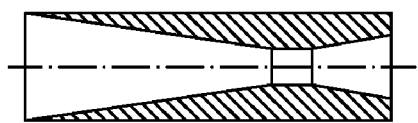
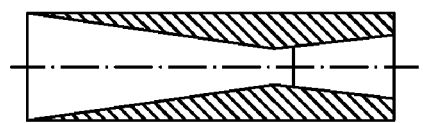
Fig. 3　　　　　　　Fig. 4
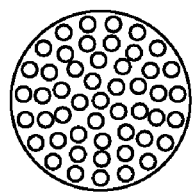
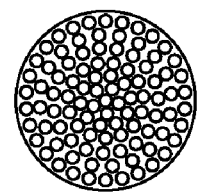
Fig. 5　　　　　　　Fig. 6

DEVICE WITH NO EMISSION FOR TREATMENT OF EXHAUST GAS

CROSS REFERENCE TO THE RELATED PATENT APPLICATION

This application claims the priority of the Chinese patent application No. 200710006467.7 with a filing date of Jan. 30, 2007.

FIELD OF THE INVENTION

This Invention relates to devices for controlling pollution of exhaust gas, especially a kind of devices with no emission resulted for treatment of exhaust gas.

BACKGROUND OF THE INVENTION

There are many existing arts for controlling pollution of exhaust gas, for example, treatment of tail gas in motor vehicles and etc. Some techniques are based on combination of fuel and batteries to reduce emission, but techniques for disposal of used batteries are not in mature state and secondary pollution may be resulted. Some techniques is based on electrical ejection in conjunction with ternary catalytic clarifier, this is the important means that China Government is promoting energetically for controlling tail gas of motor vehicles. This ternary catalytic clarifier is actually an external clarifier, which contains three metal elements, i.e. Platinum, Rhodium and Palladium, in an alveolate structure of absorption. When temperature of engine of motor vehicles during its operation in high speed reaches to 700~800° C., chemical reaction will occur on these three elements and they effectively absorb and clarify tail gas of automobiles, therefore reduce content of CO, HC and NOX in the tail gas and make it comply with relevant national standards on emission. Since the ternary catalytic clarifier is an external clarifier only, control of air/fuel ratio and situation of fuel pulverization in engines will have great influence on its normal operation. In case any failure such as damaged oxygen sensor, control switch and/or air adding valve appears in electrical ejection device, its ternary catalytic clarifier will soon become failed and cannot perform its intended function. In addition, alveolate structure of the ternary catalytic clarifier is easy to be clogged and saturated, and as result, loses its clarification ability. This will result in need of frequent replacement of clarifier and the operation cost will be increased (Generally, its normal operation period is limited within 90 days). The ternary catalytic clarifier can play its role to reduce pollution from tail gas of motor vehicles only, it cannot eliminate the tail gas.

SUMMARY OF THE INVENTION

Aim of this Invention is to provide a kind of devices with no emission for treatment of exhaust gas that may burn out all exhaust gas.

For realization of above aim, this Invention provides a device with no emission for treatment of exhaust gas, which is a vessel with openings only as inlet. Two exchange sections are provided inside the vessel after inlet of exhaust gas, each exchange section includes a jet hole means, a gas exchange chamber, a diffusion hole means and a gas mixture chamber. The gas exchange chamber is provided between the jet hole means and diffusion hole means, connecting both of them together. A through opening to outside atmosphere area is provided at the exchange chamber of the first exchange section. The gas mixture chamber is provided at each connection part between two sequential stages of exchange section. Feedback pipes are provided for connecting each gas mixture chamber from second to last exchange section to the inlet of the first exchange stage.

One improved design for this Invention is as follows: the device with no emission for treatment of exhaust gas has pipes of negative pressure to connect the gas exchange chamber with gas exchange chamber or the gas exchange chamber with gas mixture chamber from the third to last exchange section.

Another improved design for this Invention is as follows: the device with no emission for treatment of exhaust gas is provided with a pipe at the mixture gas chamber of last gas exchange section, leading to atmosphere.

Another improved design for this Invention is as follows: the device with no emission for treatment of exhaust gas is provided with holes of laminar flow instead of jet holes in jet hole means.

With this structure, the Device receives through its inlet exhaust gas with pressure, which would enter into exchange section and jet inwards. This jet gas causes very strong entrainment effect and makes gas chamber become vacuum and air with oxygen being sucked into the chamber from atmosphere via the through opening to outside atmosphere. Combustible gas in this mixed gas with high pressure is burned furiously in the next gas chamber and combustible and harmful substance is decomposed in burning. The left exhaust gas is transferred into next stage of the exchange section. On entering next stage of exchange section, exhaust gas revolves with high speed because of negative pressure in the gas chamber and under the feedback effect of holes of negative pressure, negative energy produced by the negative pressure and working energy of the exhaust gas are balanced out each other and very strong rolling is resulted in. This causes heavy collisions and momentum transfer, i.e. "black hole" of gas. The higher the negative pressure is, the more exhaust gas is consumed, and remaining not-consumed gas will be fed back via feedback pipe to inlet of the Device and treated repeatedly. In this way, the exhaust gas will be burned entirely and no emission will occur.

BRIEF DESCRIPTION OF THE DRAWINGS

FIG. 3 is structural diagram of jet hole in this Invention.

FIG. 4 is structural diagram of holes of laminar flow in this Invention.

FIG. 5 is sectional view along line A-A in FIG. 1.

FIG. 6 is sectional view along line B-B in FIG. 1.

DETAIL DESCRIPTION OF THE INVENTION

Figure 1:
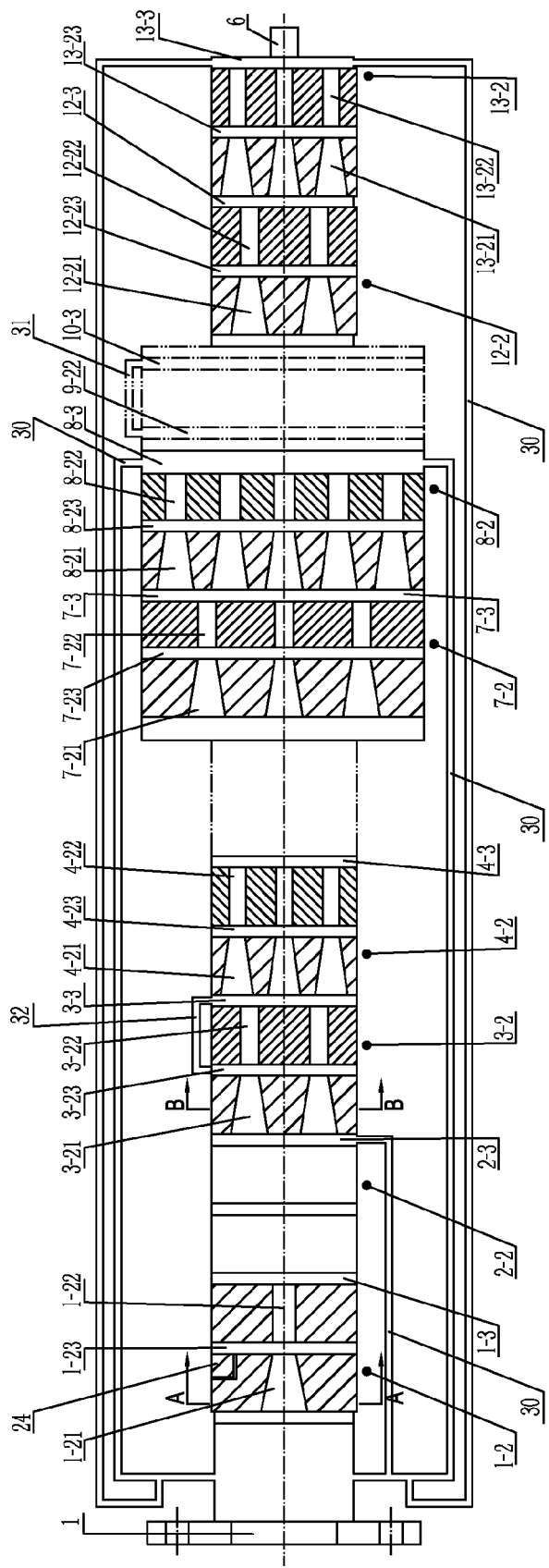
FIG. 1 is structural diagram of one embodiment of this Invention.

A device with no emission for treatment of exhaust gas is shown in FIG. 1, FIG. 3, FIG. 4, FIG. 5 and FIG. 6. A vessel has an opening as an inlet. Thirteen exchange sections 2 in sequence are provided inside the vessel after inlet 1 of exhaust gas.

In the first exchange section 1-2 the jet hole means 1-21 is provided with 50 jet holes and the diffusion hole means 1-22 is provided 50 diffusion holes, a gas exchange chamber 1-23 is provided between the jet hole means 1-21 and diffusion hole means 1-22, connecting to both of them.

A through opening 24 leading to outside atmosphere area is provided at the gas exchange chambers 1-23 of the first exchange section 1-2.

In the second and third gas exchange sections 2-2, 3-2, each jet hole means is provided with 50 jet holes and each diffusion hole means is provided 50 diffusion holes.

In the fourth gas exchange section 4-2, the jet hole means 4-21 is provided with 100 jet holes and the diffusion hole means 4-22 is provided 100 diffusion holes.

In the fifth, sixth, seventh, eighth and ninth gas exchange sections the jet hole means is provided with 200 jet holes and the diffusion hole means is provided 200 diffusion holes.

In the tenth, eleventh, twelfth and thirteenth gas exchange sections the jet hole means is provided with 100 jet holes and the diffusion hole means is provided with 100 diffusion holes.

A gas mixture chamber (1-3, 2-3 - - - or 13-3) is provided at each connection part between two sequential gas exchange section, connecting to the two neighbor sections.

Feedback pipes 30 is provided at each gas mixture chamber 2-3, 8-3, 13-3 in the second, eighth and thirteenth gas exchange sections, connecting to the inlet 1 of the first stage of exchange section 1-2.

In third to last gas exchange sections the gas exchange chamber with gas exchange chamber or the gas exchange chamber with gas mixture chamber are connected by pipe of negative pressure (such as pipes 31, 32).

In the gas mixture chamber 13-3 of the last stage of exchange section 13-2, there is a pipe 6 leading to atmosphere.

The jet holes in jet hole means may be replaced with holes of laminar flow.

Figure 2:
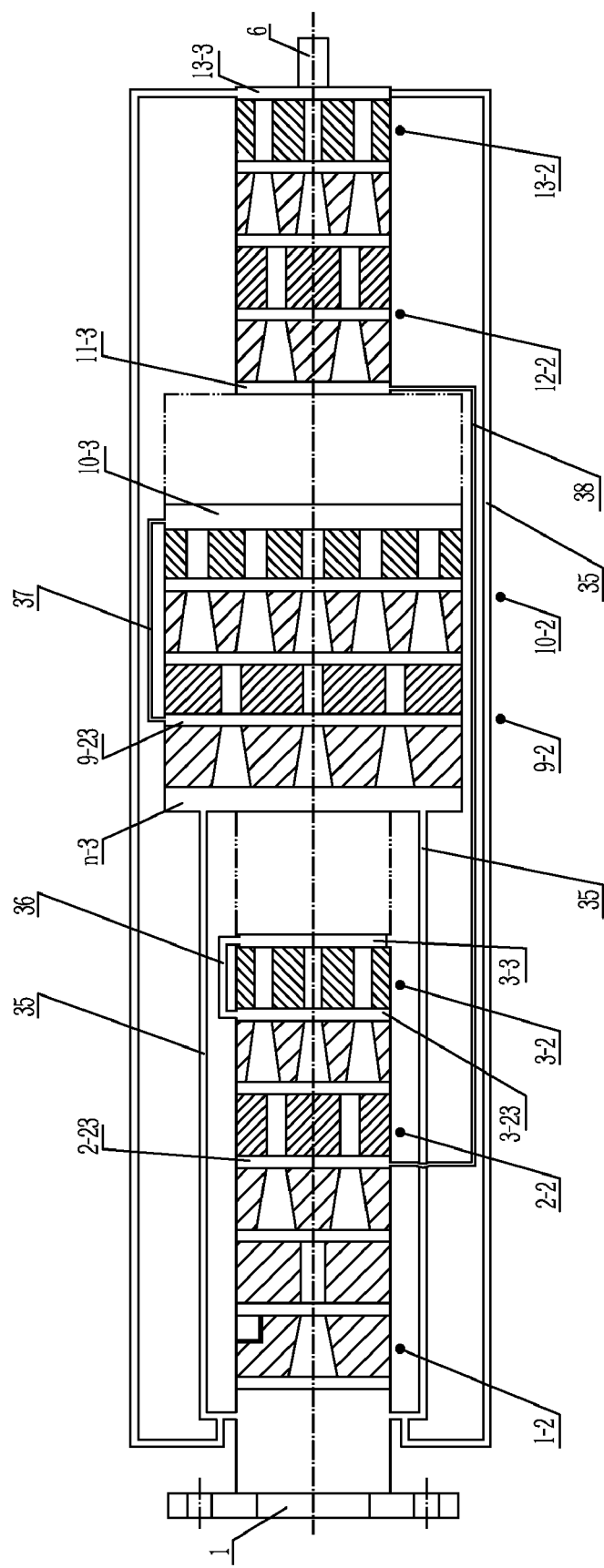
FIG. 2 is structural diagram of another embodiment of this Invention.

As shown in FIG. 2:

In the sixth, eleventh and thirteenth gas exchange sections 6-2, 11-2 and 13-2, feedback pipes 35 connect gas mixture chambers with the inlet 1 of the first gas exchange section 1-2 (such as pipe 35).

In each one of the third to eighth exchange sections the pipes of negative pressure (such as pipe 36) connect the gas exchange chamber with the gas mixture chambers.

The pipe of negative pressure 37 connects the gas exchange chambers 9-23 of ninth gas exchange section with the mixture gas chamber 10-3 of the tenth gas exchange section.

The pipe of negative pressure 38 connects the gas exchange chambers 2-23 of second gas exchange section with the gas mixture chamber 11-3 of eleventh gas exchange section.

Figure 7:
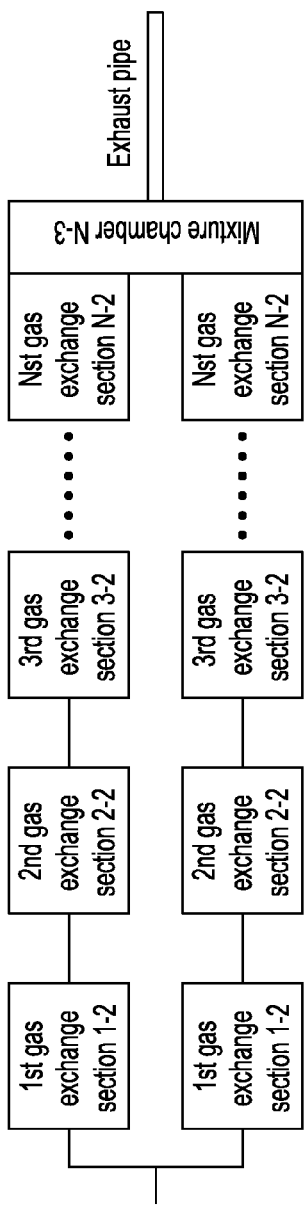
FIGS. 7 & 8 are diagrams showing the devices are connected in parallel mode.
Figure 8:
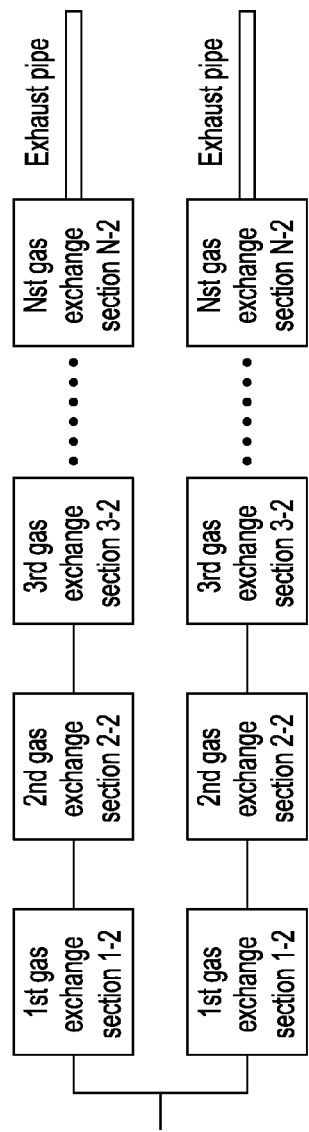

As shown in the FIG. 7 and FIG. 8, it is allowed to have a mode in parallel connection. The first series connection of first gas exchange section, second gas exchange section, - - - and nth gas exchange section connects with the second series connection of first gas exchange section, second gas exchange section, - - - and nth gas exchange section in parallel, then make last two gas mixture chambers together, and a exhaust pipe is connected with the joined gas mixture chamber. Also, the last two mixture chambers can keep independent; two exhaust pipes are connected with the two gas mixture chambers respectively.

Although the description above contains many specificities, these should not be construed as limiting the scope of the invention but as merely providing illustrations of some of the presently preferred embodiments of this invention. Thus the scope of the invention should be determined by the appended claims and their legal equivalents, rather than by the examples given.

Prototype of this invention has been produced and no emission of exhaust gas is found out in testing of this prototype.

What is claimed is:

1. A devices with no emission for treatment of exhaust gas comprising:
   a vessel having an inlet for receiving exhaust gas, at least two exchange sections located inside the vessel after the inlet of exhaust gas;
   the exchange section including a jet hole means, a gas exchange chamber, a diffusion hole means, and a gas mixture chamber;
   the gas exchange chamber being between the jet hole means and the diffusion hole means and connecting them together;
   a through opening leading to atmosphere provided at the first gas exchange chamber;
   the gas mixture chamber being between two sequential exchange sections after the means with diffusion holes;
   feedback pipes connect the mixture chambers in the second to last exchange section with the inlet.

2. The device with no emission for treatment of exhaust gas of claim 1, wherein from the third gas exchange section to the last gas exchange section at least one of the gas exchange chamber being connected with another one of gas exchange chamber by a pipe of negative pressure connect or at least one of the gas exchange chamber being connected with another one of gas mixture chamber.

3. The device with no emission for treatment of exhaust gas of claim 1, wherein a pipe leading to atmosphere is provided at the gas mixture chamber of the last exchange section.

4. The device with trace emission for treatment of exhaust gas of claim 1, wherein the device has a first series connection including a first gas exchange section with an inlet, second gas exchange section, - - - and nth gas exchange section with a last gas mixture chamber and a second series connection including a first gas exchange section with an inlet, second gas exchange section, - - - and nth gas exchange section with a last mixture chamber, the two inlets are merged together as one inlet, the two last gas mixture chambers is merged together as one last gas mixture chamber, a exhaust pipe is connected with the merged gas mixture chamber.

5. The device with trace emission for treatment of exhaust gas of claim 1, wherein the device has a first series connection including a first gas exchange section with an inlet, second gas exchange section, - - - and nth gas exchange section with a last gas mixture chamber and a second series connection including a first gas exchange section with an inlet, second gas exchange section, - - - and nth gas exchange section with a last mixture chamber, the two inlets are merged together as one inlet, two exhaust pipes are connected with the two gas mixture chambers respectively.

6. The device with no emission for treatment of exhaust gas of claim 1, wherein the device has 13 exchange sections, each exchange section includes the jet hole means, the gas exchange chamber, the diffusion hole means, the gas mixture chamber, the exhaust pipe is provided at the gas mixture chamber of the last exchange section, the through opening to atmosphere is provided at the gas exchange chamber of first gas exchange section.

7. The device with no emission for treatment of exhaust gas of claim 6, wherein a feedback pipes connect each gas mixture chamber in the second, eighth and thirteenth gas exchange section with the inlet.

8. The device with no emission for treatment of exhaust gas of claim 6, wherein from the third to last gas exchange section the gas exchange chamber with gas exchange chamber or the gas exchange chamber with gas mixture chamber are connected by pipes of negative pressure.

9. The device with no emission for treatment of exhaust gas of claim 6, wherein feedback pipes connect each mixture chamber in the sixth, eleventh and thirteenth gas exchange section with the inlet.

10. The device with no emission for treatment of exhaust gas of claim 6, wherein a pipe of negative pressure connects the gas exchange chamber of the ninth gas exchange section with the gas mixture chamber of tenth gas exchange section.

11. The device with no emission for treatment of exhaust gas of claim 6, wherein a pipe of negative pressure connects the gas exchange chamber of second gas exchange section with the gas mixture chamber of the eleventh gas exchange section.

12. The device with no emission for treatment of exhaust gas of claim 6, wherein in the first gas exchange sections, the jet hole means and the diffusion hole means each has 50 holes respectively.

13. The device with no emission for treatment of exhaust gas of claim 6, wherein in the second and third gas exchange sections,
the jet hole means and the diffusion hole means each has 50 holes respectively.

14. The device with no emission for treatment of exhaust gas of claim 6, wherein in the fourth gas exchange section the jet hole means and the diffusion hole means each has 100 holes respectively.

15. The device with no emission for treatment of exhaust gas of claim 6, wherein in the fifth, sixth, seventh eighth and ninth gas exchange sections the jet hole means and diffusion hole means each has 200 holes respectively.

16. The device with no emission for treatment of exhaust gas of claim 6, wherein in the tenth, eleventh, twelfth and thirteenth exchange the jet hole means and diffusion hole means each has 100 holes respectively.

\* \* \* \* \*